Jan. 19, 1960 C. E. LOMAX 2,921,984

SMALL SUBOFFICE TELEPHONE SYSTEM

Filed April 23, 1958 7 Sheets-Sheet 1

INVENTOR.
CLARENCE E. LOMAX

BY C. A. Gulbrandsen

ATTY.

Jan. 19, 1960 C. E. LOMAX 2,921,984

SMALL SUBOFFICE TELEPHONE SYSTEM

Filed April 23, 1958 7 Sheets-Sheet 2

INVENTOR.
CLARENCE E. LOMAX
BY
C. A. Gulbrandsen
ATTY.

INVENTOR.
CLARENCE E. LOMAX
BY
C. A. Gulbrandsen
ATTY.

FDR.-CONN. 400

INVENTOR.
CLARENCE E. LOMAX
BY
C. A. Gullbrandsen
ATTY.

Jan. 19, 1960 C. E. LOMAX 2,921,984

SMALL SUBOFFICE TELEPHONE SYSTEM

Filed April 23, 1958 7 Sheets-Sheet 5

INVENTOR.
CLARENCE E LOMAX
BY
C. A. Gulbrandsen
ATTY.

Jan. 19, 1960 C. E. LOMAX 2,921,984

SMALL SUBOFFICE TELEPHONE SYSTEM

Filed April 23, 1958 7 Sheets-Sheet 6

RING. SEL. REPEATER 700

INVENTOR.
CLARENCE E. LOMAX

BY C. A. Gulbrandsen

ATTY.

SMALL SUBOFFICE TELEPHONE SYSTEM

Filed April 23, 1958 7 Sheets-Sheet 7

INVENTOR.
CLARENCE E. LOMAX
BY C. A. Gulbrandsen
ATTY.

2,921,984
Patented Jan. 19, 1960

2,921,984

SMALL SUBOFFICE TELEPHONE SYSTEM

Clarence E. Lomax, Hastings, Nebr., assignor to General Telephone Laboratories, Incorporated, Northlake, Ill., a corporation of Delaware Application April 23, 1958, Serial No. 730,319

12 Claims. (Cl. 179—17)

This invention relates in general to telephone systems, and more particularly to small sub-office trunking arrangements for enabling connections between subscribers therein via a main exchange.

It is an object of the present invention to provide small suboffices having trunks to a main exchange and in which the suboffice subscribers have the same number of digits as the regular main exchange subscriber lines.

Another object of the invention is to provide a small suboffice trunking system whereby no ringing or tone machines are provided in the suboffices.

Another object of the present invention of the above type character wherein, the application, selection and cut-off of the ringing frequency, busy tone, ring-back tone and transmission battery for called and calling subscribers alike are all provided from the main exchange.

A feature of the present invention resides in a ringing selector-repeater at the main exchange which upon receipt of the last two digits dialed, chooses a ringing frequency in a ringing interrupter while simultaneously repeating these two digits into a finder-connector to seize the called line, which lines are on a terminal-per-station basis.

Other objects and features will become apparent from a perusal of the following specification taken in conjunction with the accompanying drawings, in which.

Figure 1:
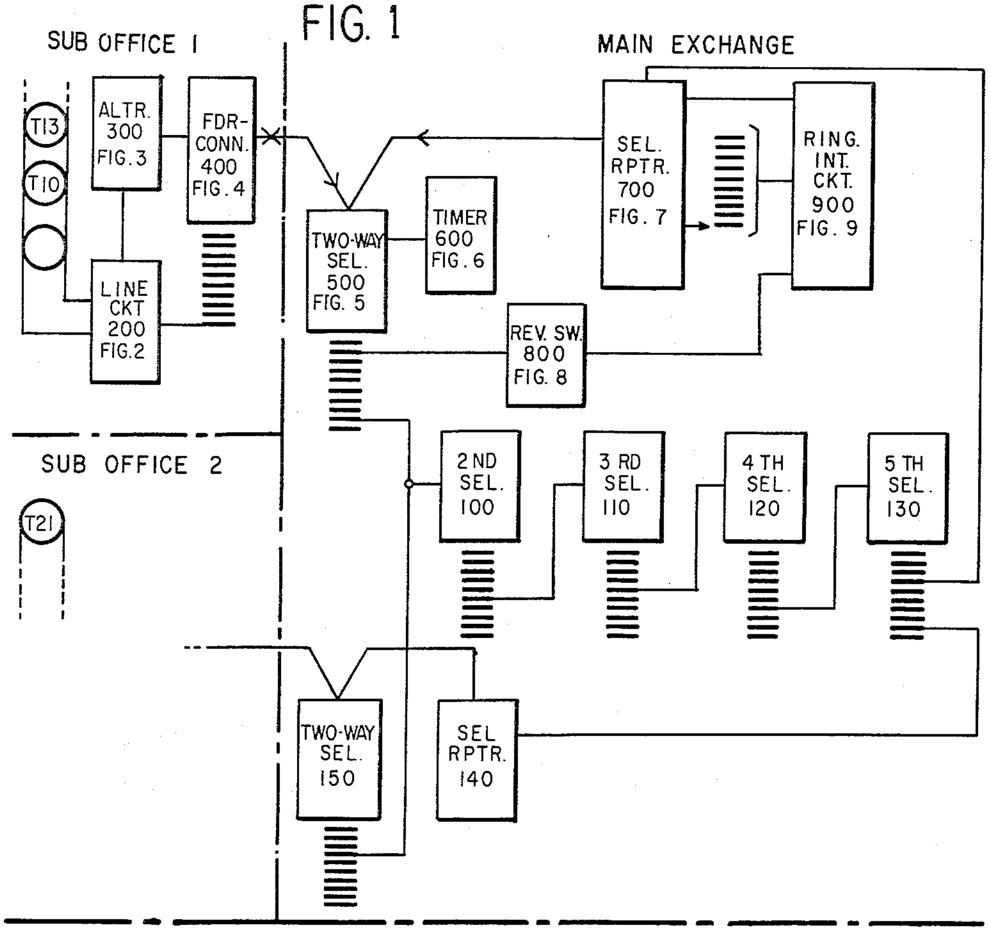
Fig. 1 shows a trunking diagram of the present telephone system.

Referring briefly to the trunking diagram in Fig. 1, each sub-office exchange comprises line circuits, allotters, and finder-connectors. The main exchange comprises two-way selectors, selector-repeaters, ringing interrupters and conventional selectors.

When a subscriber such as T13 in sub-office 1 makes an outgoing call, say to subscriber T21 in sub-office 2, a line circuit 200 (Fig. 2), will operate to extend the loop to a special two-way first selector 500 (Fig. 5) via allotter 300 (Fig. 3), and a finder selector 400 (Fig. 4) in a manner to be described in the ensuing description. Selectors 100, 110, 120, 130, and 150 will be seized in successive order upon receipt of digital impulses from the calling subscriber. The remainder of the call will be handled in a manner to be described with respect to incoming calls to sub-office 1.

On an incoming call to sub-office 1, selector-repeater 700 (Fig. 7) is seized by a fifth selector such as 130 upon receipt of digital impulses. Selector-repeater 700 will in turn extend a loop circuit to finder-connector 400 via two-way selector 500. Upon receipt of the next or sixth digit dialed, selector-repeater 700 will step its wipers to select a level of bank contacts, with one bank extending to a ringing interrupter 900, while simultaneously repeating the digit dialed into finder-connector 400 to step its wipers to the level of bank contacts extending to the called party's line. Also a second wiper on a vertical bank in selector-repeater 700 prepares the extension of the calling loop to the called line. Upon receipt of the last digit dialed, the first mentionad wiper rotates on the bank level in selector-repeater 700, and seizes a ringing frequency corresponding to the numerical value of the digit dialed, and simultaneously the digit is repeated to finder-connector 400 to cause rotation of its wipers to the called party's line. If the called line is busy, relay 725 in selector-repeater 700 operates to return busy tone to the calling party. Relay 725 is normally shunted and if the called party is idle, relay 725 will not operate because it is under the control of the finder-connector and a slow-to-release relay which provides sufficient time to determine the condition of the called party's line. In other words, if the line is idle the circuit to relay 725 is opened before the shunt is removed from across this relay. Upon the idle condition the ringing frequency is sent to the called party's line and ring-back tone is sent back to the calling line from the selector-repeater 700. Also, transmission battery is provided for the calling and called party's from selector-repeater 700.

Figure 4:
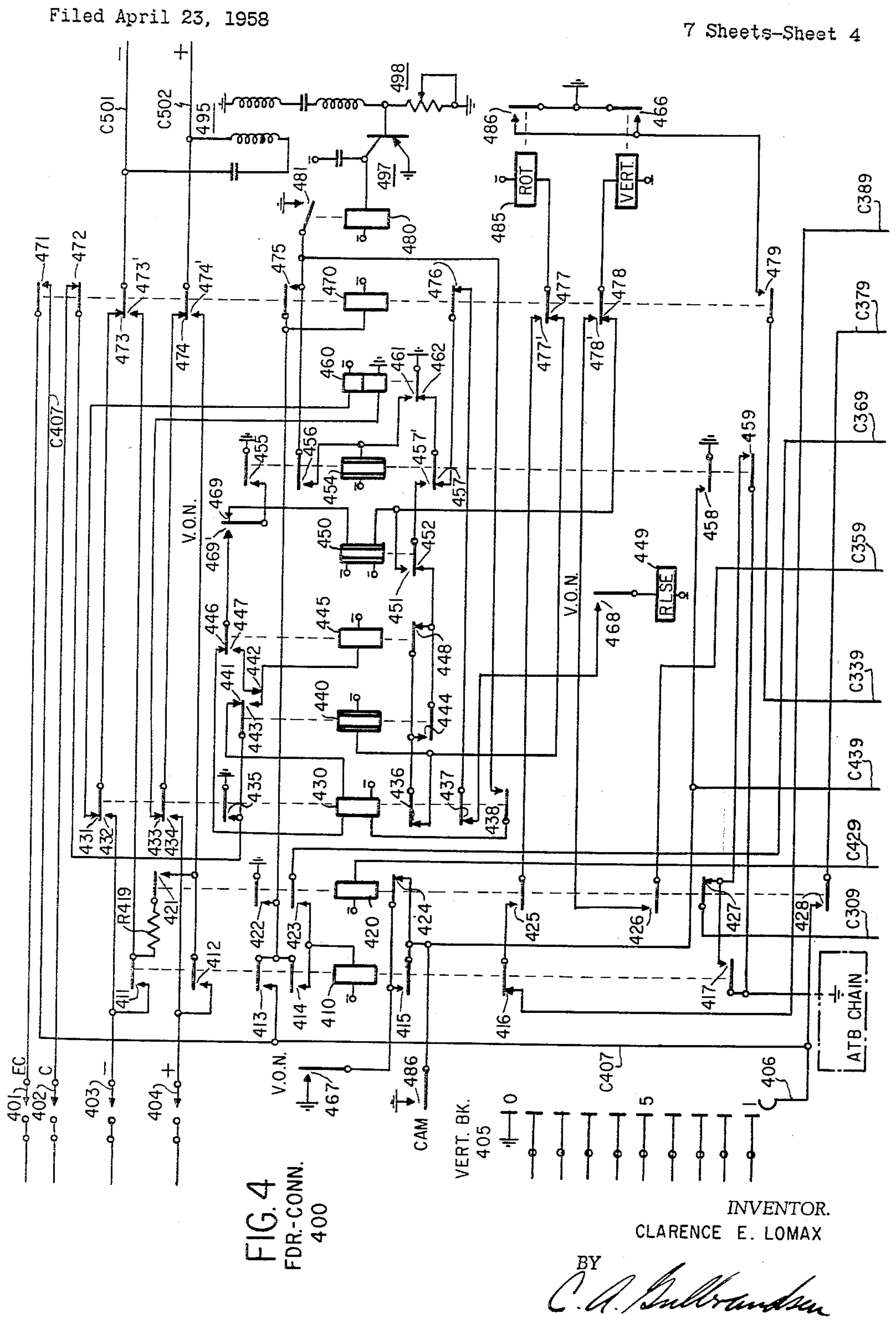
Fig. 4 shows a finder-connector 400 utilized in the suboffices.
Figures 5, 6:
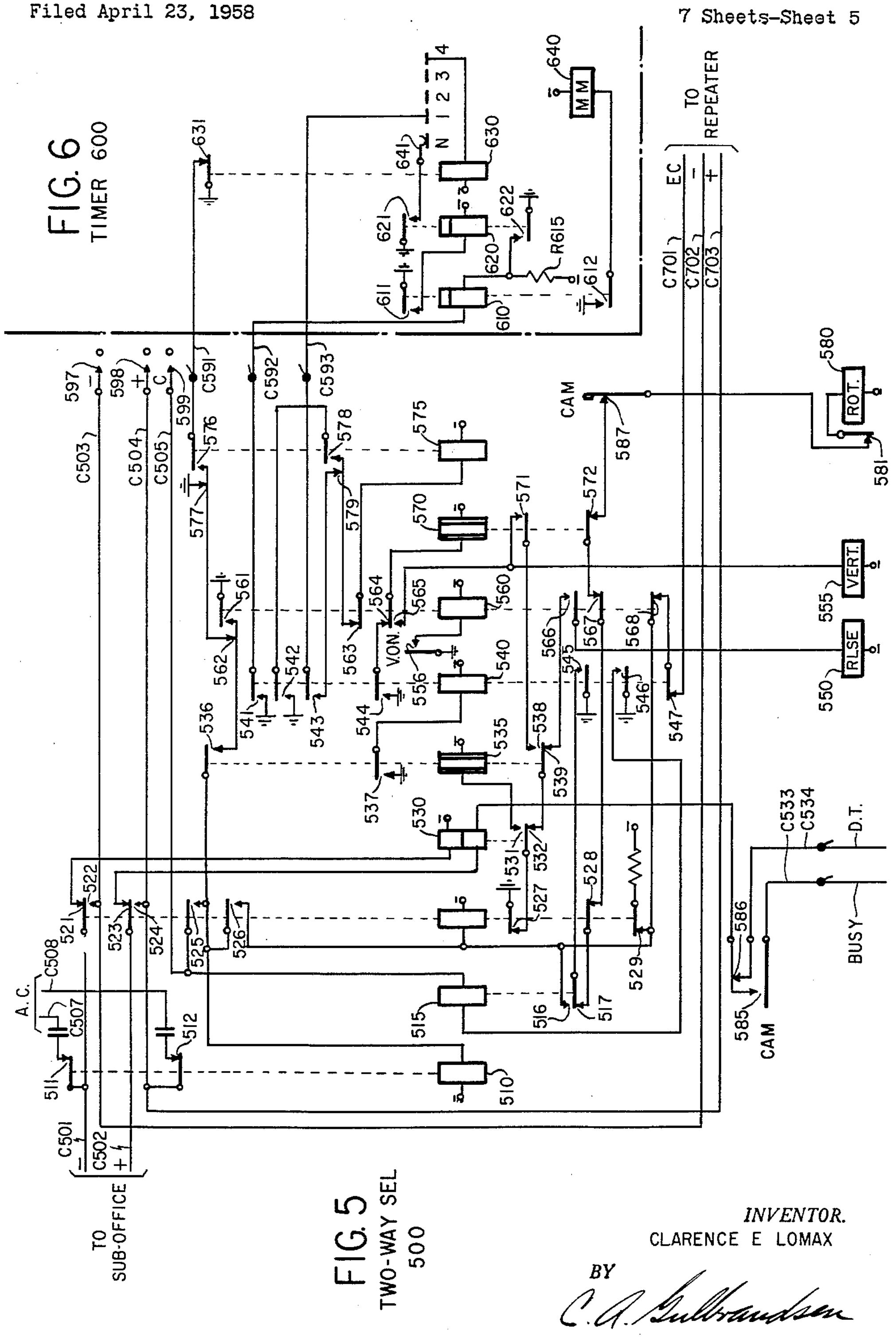
Fig. 5 shows a special two-way selector 500 utilized in the main exchange.
Fig. 6 shows a timer 600 utilized in multiple with a plurality of two-way selectors, such as 500.

Finder-connector 400 (Fig. 4) responds as a line-finder on outgoing calls and as a connector on incoming calls. A transistor 497 controls the normally operated relay 480 from a high frequency A.C. source in the succeeding two-way selector 500 (Fig. 5). Relay 480 controls the locking circuits of certain relays in finder-connector 400 for extending the loop circuit to selector 500. Thus each time the loop circuit is extended in either direction, the A.C. source is removed to restore relay 480 to hold the loop circuit, and each time the loop circuit is opened the A.C. source is placed across the transistor to release the finder connector.

Figure 8:
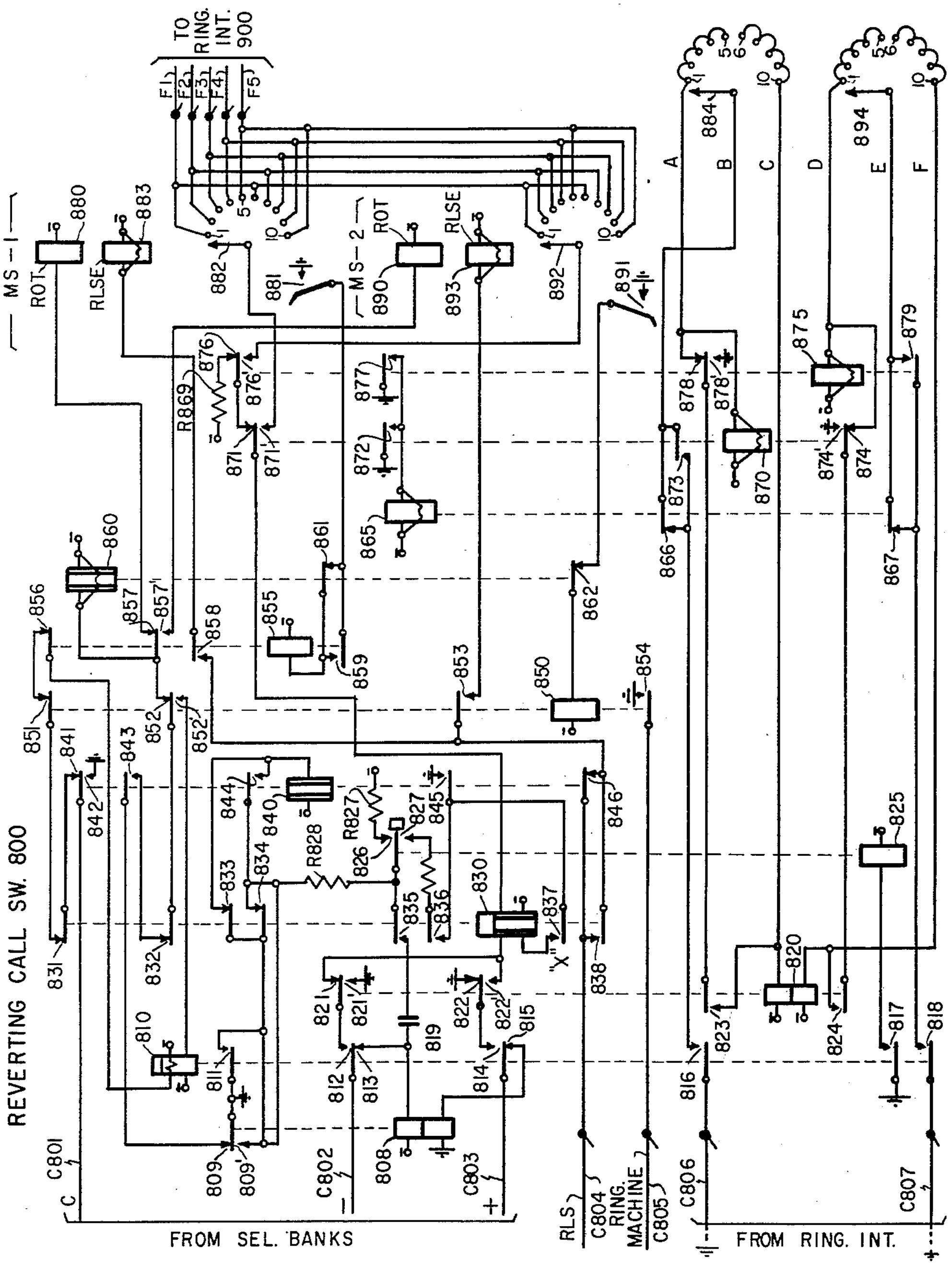
Fig. 8 shows a reverting call switch 800 utilized in the main exchange.

A reverting call switch 800 (Fig. 8) is provided for reverting calls upon dialing a first predetermined digit, the digit "9." A pair of minor switches MS–1 and MS–2 are provided whereby, the first minor switch wipers are connected to the dialing party's ringing frequency when the first digit is dialed herein, and the second minor switch wipers connects to the dialed party's ringing frequency when the second digit is dialed herein. When the receiver is replaced at the dialing station the ringing frequencies are alternately sent to the dialing and dialed parties. The ringing is stopped when the first party removes his receiver, and tick tone is provided for several seconds after the called party answers to inform him that this is a reverting call and he should wait for the calling party to come back on the line. Five ringing frequencies are utilized from a ringing interrupter 900 (Fig. 9) with either sides of the lines used and determined by the digits dialed. In the present case, digits 1–5 send the chosen ringing frequency back over the negative side of the line and digits 6–0 send the chosen ringing frequency back over the positive side of the line.

A detailed description will now follow:

*Outgoing call from Sub-Office 1*

Assuming that subscriber T1 in sub-office 1 wishes to call subscriber T21 in sub-office 2, the calling subscriber will initially remove the handset from the cradle. A loop circuit will now be closed to the associated line circuit 200 (Fig. 2) and operate relay 210 over an obvious circuit including conductors C201 and C202. At contacts 212 ground is closed over C conductor C203 to all the control contacts on the first level of the finder-connector bank multiples. At contacts 214 ground is closed over start lead C215 through a resistance (not shown) to allotter 300 (Fig. 3). This ground on start lead C215 is also placed on the first levels of the multipled vertical banks (such as 405, Fig. 4) of the associated finder-connectors.

Figure 3:
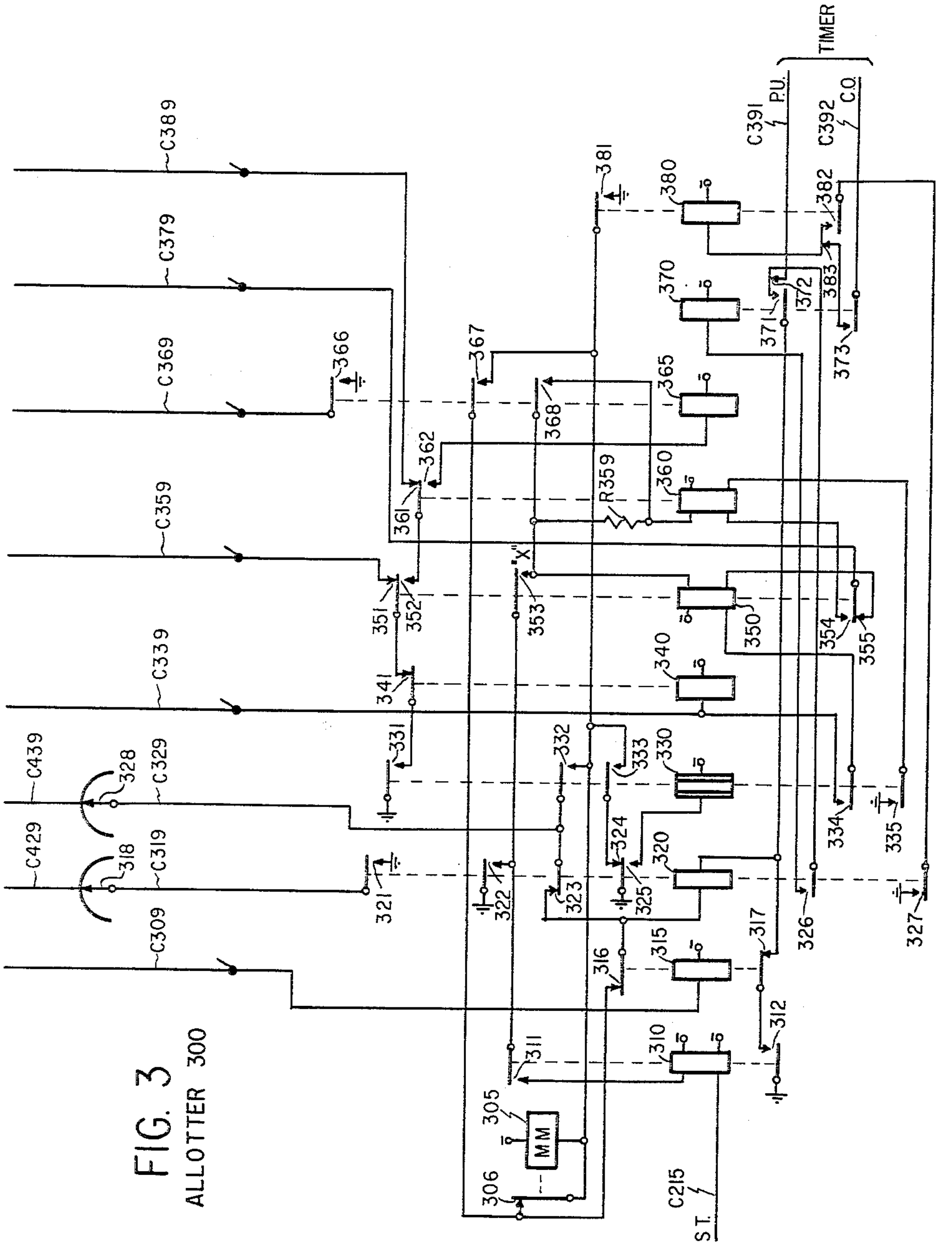
Fig. 3 shows an allotter 300 utilized in the suboffices.

Relay 310 in allotter 300 (Fig. 3) operates from the ground on start lead C215 through its lower winding, and at contacts 311 prepares a locking circuit for itself. At contacts 312 a circuit is closed to relay 320; the circuit extending from ground, contacts 312, 317, winding of relay 320, contacts 316, 306, winding of motor magnet 305 to battery. Motor magnet 305 will not operate over this circuit due to the resistance in the winding of relay 320. Relay 320 operates, and at contacts 322 completes an obvious locking circuit to relay 310 via its upper winding. At contacts 321 ground is placed on wiper 318 of the finder start switch. At contacts 325 an obvious circuit is closed to relay 330. At contacts 326, relay 370 is placed under the control of a timer. Relay 330 operates and at contacts 331 places ground on the vertical start conductor C359 which is multipled to all the associated finder-connectors, such as 400 (Fig. 4). At contacts 332 motor magnet 305 is connected to wiper 328 of the guard switch.

Assuming that finder start wiper 318 is in engagement with a contact extending to finder-connector 400 (Fig. 4), and finder-connector is idle, ground from contact 321 will operate relay 420 over an obvious path including conductor C429. At contacts 422, relay 420 completes an obvious circuit to relay 470. Relay 470 operates and at contacts 473′ and 474′ in conjunction with contacts 421, closes a loop circuit including resistance 419 to the incoming selector 500 (Fig. 5) over conductors C501 and C502. At contacts 478′ and 426 a circuit is closed to vertical magnet 465 via conductor C359, contacts 351, 341, and 331 to ground. The extending of the mentioned loop circuit to incoming selector 500 will remove the high frequency across transformer 495 and transistor 497, in a manner to be disclosed in the ensuing description, to restore normally operated relay 480. At contacts 481, relay 480 closes a locking circuit to relay 470 via contacts 475.

Vertical magnet 465 energizes and steps wipers 401, 402, 403, 404, and vertical wiper 406 one step verticalling to their respective bank contacts. Also, contacts 466 close to complete a circuit to relay 340 in allotter 300; the circuit extending from ground, contacts 466, 479, multipled conductor C339, winding of relay 340 to battery. Relay 340 operates and at contacts 341 opens the circuit to vertical magnet 465. Vertical magnet 465 deenergizes and at contacts 466 opens the circuit to relay 340. At this point vertical wiper 406 would have come in engagement with the ground on the first vertical bank contact to complete a circuit to relay 350; the circuit extending via contacts 428, multipled conductor C379, contacts 355, lower winding of 350, contacts 344, winding of relay 340 to battery. When the wipers took their first vertical step, the V.O.N. springs operated whereby; at V.O.N. contacts 467 a ground is prepared to guard lead C429; at V.O.N. contacts 468 a circuit is prepared to release magnet 449; at V.O.N. contacts 469′ a circuit is prepared to relay 430. Had the first level on vertical bank 405 not been the marked level, relay 340 and vertical magnet 465 would have intermittently operated until the marked level had been engaged by wiper 406. Relay 350 partially operates in series with relay 340, and being energized only sufficiently to operate its "X" contacts 353, which closes a locking circuit to relay 350 via contacts 322 and its upper winding. Over this last circuit relay 350 operates completely and at contacts 355 opens the circuit to relay 340, which restores. At contacts 354 a circuit is prepared to relay 360. At contacts 352 a circuit is closed to rotary magnet 485; the circuit extending from ground, contacts 331, 341, 352, 361, multipled conductor C389, contacts 416, 425, 477′, winding of rotary magnet 485 to battery. The wipers will now be rotated in search of the marked bank contact, which in this case will be every "C" contact on level one.

Rotary magnet 485 energizes and at contacts 486 closes a circuit to relay 340; the circuit extending from ground, contacts 486, 479, multipled conductor C339, winding of relay 340 to battery. Also, the wipers 401, 402, 403, 404 and 406 take one step rotary whereby, vertical wiper 406 disengages its bank contact to remove the ground thereon, however without having any effect at this time. Relay 340 operates, and at contacts 341 opens the circuit to rotary magnet 485. Rotary magnet 485 deenergizes and at contacts 486 opens the circuit to relay 340. Relay 340 restores, and at contacts 341 re-closes the circuit to rotary magnet 485. This sequence of operations would continue to rotate the wipers over their respective bank contacts, however when EC wiper 401 engaged its first bank contact and vertical wiper 406 disengaged its contact a series circuit is closed to relay 220 in line circuit 200 and relay 360 in allotter 300; the circuit extending from battery, winding of relay 220, contacts 231, 213, EC conductor C204, bank contact, wiper 401, contacts 471, conductor C407, contacts 428, multipled conductor C379, contacts 354, lower winding of relay 360, contacts 335 to ground.

Relay 360 operates and at contacts 361 opens the circuit to rotary magnet 485, which subsequently restores. At contacts 362 and the restoration of relay 340 at contacts 341, closes an obvious circuit to relay 365. Relay 365 operates, and at contacts 366 closes a circuit to relay 410; the circuit extending from ground, contacts 366, multipled conductor C369, contacts 423, winding of relay 410 to battery. At contacts 367, an alternate path is closed to relay 320; the circuit extending from ground, contacts 312, 317, winding of relay 320, contacts 316, 367, winding of motor magnet 305, to battery. At contacts 368, an alternate circuit is closed to relay 360 bypassing resistance R359. Relay 220 in line circuit 200 (Fig. 2) operates, and closes its "X" contacts 223 first to lock operated over EC lead C204 and free of relay 210. At contacts 221 and 222 the circuit to relay 210 is opened. At contacts 224, an obvious circuit is closed to relay 230. Relay 230 operates and at contacts 233 removes ground from start lead C215. Relay 210 restores, and at contacts 211 places battery on C lead C203 however, without effect at this time.

Relay 410 operates in finder-connector 400, and at contacts 411 and 412 extends a loop circuit from the calling subscriber T13 to selector 500. At contacts 414 a multiple locking circuit is provided to relay 410 from ground at contacts 422 and 481. At contacts 415, a circuit is closed to motor magnet 305; the circuit extending from ground, V.O.N. contacts 467, contacts 415, conductor C439, wiper 328, conductor C329, contacts 332, winding of motor magnet 305, to battery. At contacts 417 an all trunks busy chain ground is prepared to relay 315. Motor magnet 305 energizes, and at contacts 306 opens the original operating circuit to relay 320. The alternate path for relay 320 is now shunted by the ground on guard lead C329, to thus restore relay 320. The restoration of relay 320, at contacts 321 opens the circuit to relay 420. At contacts 322, the multiple circuits to relays 310, 350 and 360 are opened. At contacts 323 a self-interrupter circuit to motor magnet 305 is prepared. At contacts 324 an alternate circuit to maintain motor magnet 305 energized, is closed via contacts 333. At contacts 325 the circuit to relay 330 is opened. However, relay 330 is slow-to-release and remains operated for a short duration. At contacts 326 the prepared circuit to relay 370 is opened.

Relay 350 restores, and at contacts 352 opens the circuit to relay 365. Relay 360 restores and further opens the circuit to relay 365. Relay 365 restores, and at contacts 366 opens the original operating circuit to relay 410. However, relay 410 remains operated over the mentioned locking circuit. Assuming that no calls are waiting (ground on start lead C215), relay 310 will restore. It should be pointed out that when relay 320 restored, the shunt is maintained on relay 320 via its own contacts 323 and conductor C329.

After a short duration slow-to-release relay 330 restores, and at contacts 332 opens the energizing circuit to motor magnet 305. Motor magnet 305 will deenergize and step the wipers 318 and 328 to their next respective contacts. Also, contacts 306 close to prepare a self-interrupter circuit for motor magnet 305. The stepping of wiper 328 will remove the ground extending from finder-connector 400. In the event that the next finder-connector stepped to by the wiper 328 is also busy, ground will be encountered to again energize motor magnet 305; the circuit extending from ground, wiper 328, conductor C329, contacts 323, 316, 306, motor magnet 305 to battery. Motor magnet 305 by means of its self-interrupter contacts 306 will thus intermittently operate until an idle finder-connector is seized.

In finder-connector 400, relay 420 restored, and at contacts 421 resistor R419 is removed from the loop. At contacts 422 and 423 one of the locking and the operating circuits respectively to relay 410 are opened. However, relay 410 remains operated via ground at contacts 481. At contacts 424 an alternate path is provided to maintain ground on guard conductor C439. At contacts 427 the all trunks busy chain is further prepared to relay 315 in allotter 300.

Figure 7:
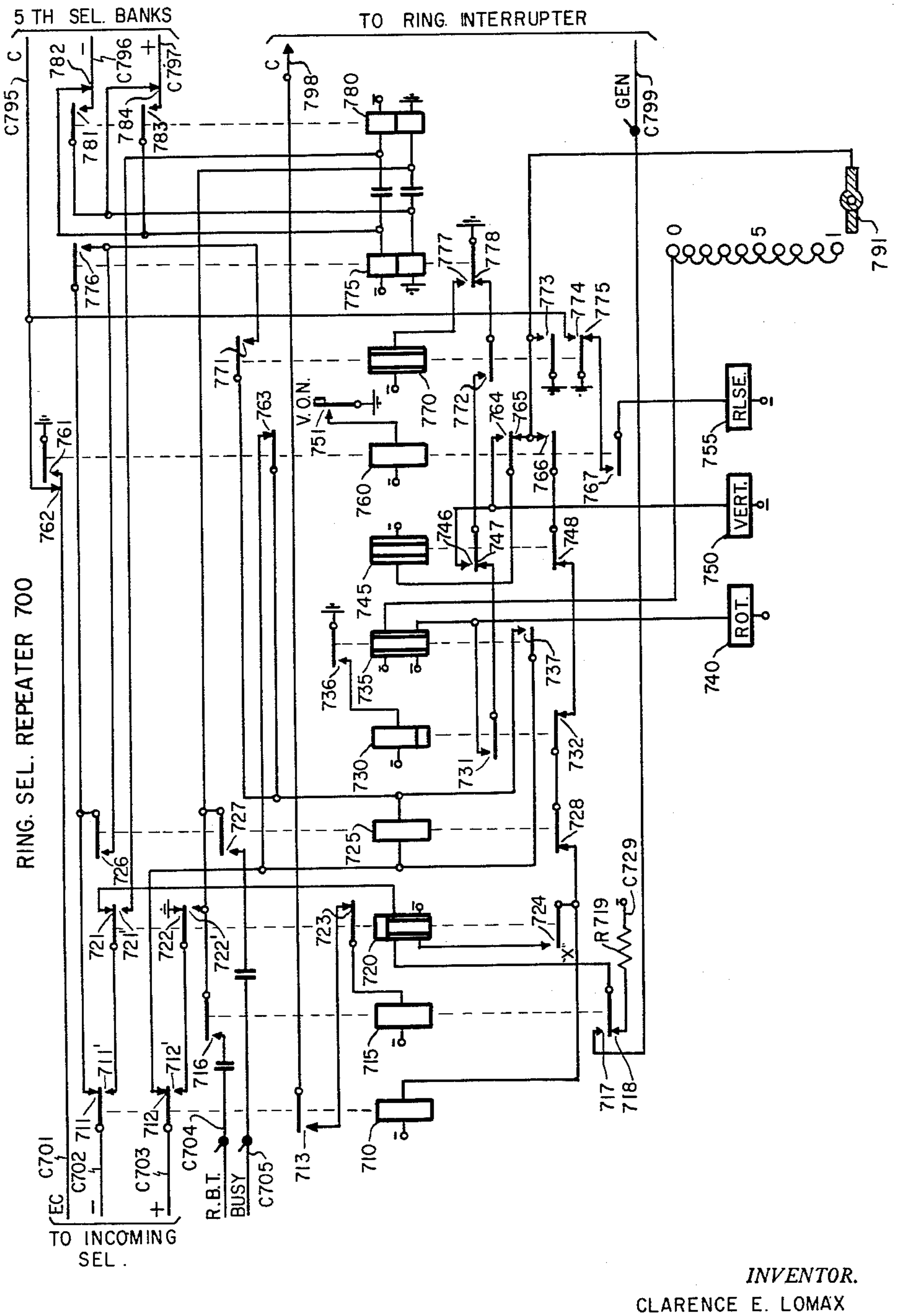
Fig. 7 shows a ringing selector-repeater 700 utilized in the main exchange.

It will be recalled in the preceding description that when relay 420 operated a loop circuit was closed to selector 500 (Fig. 5). This loop circuit operated relay 530 therein; the circuit extending from battery, upper winding of relay 530, contacts 521, negative conductor C501, contacts 473′ (Fig. 4), resistor R419, contacts 421, 474′, positive conductor C502, contacts 523, lower winding of relay 530, cam contacts 586, conductor C534 to dial tone and ground. Relay 530 operates, and at contacts 531 closes an obvious circuit to relay 535. Relay 535 operates and at contacts 536 closes an obvious circuit to relay 510. At contacts 537, an obvious circuit is closed to relay 540. At contacts 538 a circuit is prepared to vertical magnet 555. Relay 510 operates and at contacts 511 opens the high frequency A.C. from across negative conductor C501. When this high frequency was removed as before mentioned, relay 480 in finder-selector 400 restored. This led the way for the extending of the loop circuit from the calling subscriber T13 to selector 500, as previously disclosed. At contacts 512, relay 510 also opens the A.C. to selector-repeater 700 (Fig. 7). Relay 540 operates, and at contacts 541 closes an obvious circuit to relay 610 in timer 600 (Fig. 6). At contacts 543 a circuit is prepared to relay 575 from timer 600. At contacts 544, an obvious circuit is closed to relay 570. At contacts 546, a circuit is prepared to relay 515. Relay 570 operates, and at contacts 571 further prepares a circuit to verical magnet 555. At contacts 572, a prepared circuit to rotary magnet 580 is further opened.

In timer 600 (Fig. 6), slow-to-operate relay 610 operates after a short time and at contacts 611 closes an obvious circuit to relay 620. At contacts 612 an obvious circuit is opened to energize motor magnet 640. Relay 620 also being slow-to-operate, operates after a short interval and at contacts 621 places ground on wiper 641. At contacts 622, relay 610 is shunted to cause restoration thereof. Relay 610 opens the circuit to motor magnet 640. Motor magnet 640 energizes and steps wiper 641 to its first contact, and closes a circuit to relay 575; the circuit extending from ground, contacts 621, wiper 641, multipled conductor C593, contacts 543, 579, 563, winding of relay to battery. Relays 610 and 620 as mentioned are both slow-to-operate, and thus the above continued sequence of operations will be a rather slow process. Relay 575 will operate and at contacts 576 transfer the ground to relay 515 from ground at contacts 631. At contacts 578 relay 575 locks operated to ground at contacts 542, before contacts 579 opens the original operating circuit to relay 575, distinguishing a make-before-break operation.

Upon receipt of the dial tone over the positive side of the loop circuit, the calling subscriber T13 will begin to dial the first digit. Assuming the first digit dialed is the digit "4," relay 530 will intermittently restore and operate four times responsive to the receipt of the digital impulse series. Upon the first restoration of relay 530, at contacts 531 the circuit of relay 535 is opened. However, relay 530 is slow-to-release and remains operated throughout the impulse series. At contacts 532 a circuit is closed to vertical magnet 555, via ground, contacts 527, 532, 538, 571, winding of vertical magnet 555, to battery. Upon each reoperation of relay 530, the circuit to vertical magnet 555 is opened. Thus, for each ground pulse received by vertical magnet 555, the wipers 597, 598, and 599 will take one step. Upon the wipers taking their respective first step, the V.O.N. springs will operate whereby at V.O.N. contacts 556 an obvious circuit is closed to relay 560. Relay 560 operates and at contacts 561, ground is closed to maintain relay 510 operated before contacts 562 opens the previous circuit thereto distinguishing a make-before-break operation. At contacts 563, the circuit to relay 575 is opened causing restoration thereof. At contacts 565, slow-to-release relay 570 operates in series with vertical magnet 555 during the receipt of ground pulses. At contacts 566 a circuit is prepared to release magnet 550. At contacts 567 a circuit is prepared to rotary magnet 580. At contacts 568, resistance battery is opened to prevent seizure of selector 500 from incoming calls of a fifth selector.

Upon the termination of the first dialed digit, wipers 597, 598, and 599 will rest on their respective fourth levels of bank contacts, vertical magnet 555 will deenergize, and relay 570 restores. The restoration of relay 570, at contacts 572 closes a circuit to rotary magnet 580, the circuit extending from ground, contacts 545, 517, 528, 567, 572, 587, 581, winding of rotary magnet 580 to battery. By means of its self-interrupter contacts 581, rotary magnet 580 will rotate the wipers 597—599 over the fourth level in search of an idle second selector.

Assuming that no second selector is found idle, the wipers will rotate to the eleventh rotary or overflow position and operate the cam springs whereby; at cam contacts 585 busy tone is closed to the calling subscriber and at cam contacts 586 dial tone is removed; at cam contacts 587 the circuit to rotary magnet 580 is opened causing restoration thereof. Upon receipt of the busy tone, the calling subscriber will restore the handset and restore the equipment in a manner to be subsequently described in the ensuing disclosure.

Assuming that a second selector 100 is found idle during rotation of the wipers 597, 598, and 599, battery will be found by control wiper 599 to operate relay 515; the circuit extending from battery, wiper 599, conductor C506, winding of relay 515, contacts 546 to ground. At contacts 516, relay 515 completes a circuit to relay 520 via ground at contacts 545. At contacts 517, the circuit to rotary magnet 580 is opened causing restoration thereof. Relay 520 operates, and at contacts 521 and 523 the circuit to relay 530 is opened. At contacts 522 and 524 the loop circuit is extended to second selector 100. At contacts 525 a holding circuit is closed to relay 510 via control wiper 599, and the including of contacts 526 provides a holding circuit for relay 520. Relay 530 restores. After a short duration, slow-to-release relay 535 restores and at contacts 537 opens the circuit to relay 540. Relay 540 restores, and at contacts 541 opens the circuit to relay 610. At contacts 546 the circuit to relay 515 is opened. Relay 515 restores. Relay 610 restores to in turn restore relay 620 and motor magnet 640.

Second selector 100 will thus await the receipt of the next series of digital impulses to search for a third selector, such as 110. This sequence will thus continue to seize a fourth and fifth selector, such as 120 and 130, in a conventional manner. The next digit dialed will seize a finder-connector via a selector-repeater, such as 140, and a two-way selector, such as 150. Selector-repeater 140 is identical to selector-repeater 700 (Fig. 7), and two-way selector 150 is identical to selector 500 (Fig. 5), and will be disclosed more fully in Incoming Calls to Suboffice 1. For this reason it will be considered unnecessary to describe these operations in detail. However, it will be assumed that the call has been extended to subscriber T21 in suboffice 2.

*Timer release*

Assuming that the above mentioned call, after the calling subscriber T13 lifts the handset, the subscriber fails to dial a first digit after a certain length of time. In selector 500, relays 510, 530, 535, 540, and 570 operate as mentioned upon seizure. In timer 600, slow-to-operate relays 610 and 620 sequentially operate and restore to pulse motor magnet 640 to step wiper 641 slowly over the bank contacts. As mentioned, when wiper 641 takes its first step a circuit is closed to operate relay 575 to place relay 510 under the control of contacts 631 of relay 630, and relay 575 locks itself operated to ground at contacts 542. When the calling subscriber fails to dial a digit after a predetermined length of time, wiper 641 will be stepped to its last (4th) bank contact wherein, ground on wiper 641 will close an obvious circuit to relay 630. Relay 630 operates, and at contacts 631 opens the circuit to relay 510. Relay 510 restores, and at contacts 511 closes the high frequency A.C. across negative conductor C501 to again operate relay 480 in finder-connector 400. The operation of relay 480 at contacts 481 opens the locking circuits of relays 410 and 470, causing restoration thereof. The restoration of relays 410 and 470 at contacts 411, 412, and 473′, 474′ respectively opens the loop circuit to relay 530 in selector 500. At contacts 476 a circuit to release magnet 449 is closed; the circuit extending from ground, contacts 462, 457, 476, 437, 468, winding of release magnet 449 to battery. Release magnet 449 energizes to restore the wipers 401, 402, 403, 404, and 406 to normal and thus restore the V.O.N. springs whereby; at V.O.N. contacts 467 the last ground is removed from guard conductor C439 to avail finder-connector 400 for seizure; at V.O.N. contacts 468 the circuit to release magnet 449 is opened, causing restoration thereof; and V.O.N. contacts 469′ being insignificant.

In selector 500, relay 530 restores to open the circuit to relay 535. Slow-to-release relay 535 restores after a short duration, and at contacts 537 opens the circuit to relay 540. Relay 540 restores, and at contacts 541 opens the circuit to relay 610. At contacts 542, the circuit to relay 575 is opened. At contacts 544 the circuit to relay 570 is opened. Relays 570 and 575 restore. Relay 610 restores to in turn, restore relay 620 and motor magnet 640. The restoration of motor magnet 640 will step wiper 641 to its normal position to open the circuit to relay 630, which subsequently restores. Subscriber T13 will now fail to receive dial tone and will thus hang up.

*Reverting call*

Assuming that subscriber T13 desires to make a reverting call to subscriber T16 on the same line. In this system, as previously described, in order to make a reverting call the first digit dialed must be "9" to seize a reverting call switch. The first digit dialed into the reverting call switch corresponds to the calling party's ringing frequency, and the next digit dialed herein corresponds to the called party's ringing frequency. In order for the calling subscribers to know what digits to dial, all party line subscribers must have cards to show what stations are on the line, and what digits correspond to the correct type of ringing. The digits would not only select the desired ringing, but would indicate which side of the line the ringing is to be applied.

It will be assumed that line circuit 200, finder-connector 400, and two-way selector 500 have been seized in a manner previously described. The digit "9" will be dialed into selector 500 and the wipers will be stepped to the ninth level of bank contacts, and rotated therein, in a manner previously described. It will be assumed that reverting call switch 800 (Fig. 8) is found idle wherein, battery on control conductor C801 via non-inductive upper winding of relay 810, operates relay 515 in selector 500 in a manner previously disclosed. The loop circuit is thus extended over negative conductor C802 and positive conductor C803 to operate relay 808. The operation of relay 808 at contacts 809′ closes ground over an obvious circuit to relay 840. Relay 840 operates and at contacts 842 places ground on C conductor C801 to hold the preceding equipment in a well-known manner. At contacts 843 a circuit is prepared to relay 860 and rotary magnet 880. At contacts 844, relay 840 locks operated via contacts 834 and 809′.

The first digit to be dialed into reverting call switch will be the digit "3" corresponding to the ringing frequency of the calling party T13's ringer. Upon receipt of the three digital impulses, relay 808 will intermittently restore and operate three times. The first restoration of relay 808 at contacts 809, closes a circuit to relay 860 and rotary magnet 880 in parallel, via ground, contacts 809, 843, 832, 852 to relay 860 and battery, and contacts 857 to winding of rotary magnet of minor switch MS–1 to battery. Relay 860 being slow-to-release remains operated throughout the impulse series. Thus for each closing of contacts 809 rotary magnet 880 will pulse to step the wipers 882 and 884 of minor switch MS–1 one step over their respective bank contacts. Upon the wipers 882 and 884 taking their first step the off-normal springs operate whereby ON contacts 881 close. However, the operation of relay 860 at contacts 861 prevents the closure of an obvious circuit to relay 855. Rotary magnet 880 will thus step the wipers 882 and 884 to their respective third bank contacts, and after a short duration slow-to-release relay 860 restores and closes an obvious circuit to relay 855. Relay 855 operates and at contacts 857 opens the prepared circuit to rotary magnet 880 of MS–1, and at contacts 857′ prepares a circuit to rotary magnet 890 of minor switch MS–2. At contacts 858, a circuit is prepared to release magnet 883 of MS–1. At contacts 859, an obvious holding circuit is closed to relay 855.

The second digit dialed into reverting call switch 800 will be the digit "6" corresponding to the ringing frequency of the called party T16's ringer. Upon receipt of the six digital impulses, relay 808 will restore and operate six times. Upon the first restoration of relay 808 a circuit is closed to relay 860 and rotary magnet 890 of minor switch MS–2 in parallel; the circuit extending via ground, contacts 809, 843, 832, 852, winding of relay 860 to battery, and via contacts 857′, winding of rotary magnet 890 to battery. As mentioned, relay 860 is slow-to-release and will remain operated throughout the impulse series. Thus for each pulse received by rotary magnet 890, the wipers 892 and 894 will take one rotary step. Upon the wipers 892 and 894 taking their first rotary step, the off-normal contacts 891 close to prepare a circuit to relay 850. Rotary magnet 890 will thus step the wipers 892 and 894 to their respective sixth bank contacts upon receipt of the six digital impulses. At the end of the series of digital impulses, relay 860 will restore, and at contacts 862 will close an obvious circuit to relay 850. Relay 850 operates, and at contacts 852' prepares a circuit to relay 810. At contacts 852 the pulsing circuit to rotary magnet 890 is opened to prevent further pulsing thereof. At contacts 853, a circuit is prepared to release magnet 893 of minor switch MS–2. At contacts 894, ground is closed to start the ringing machine in the ringing interrupter.

When the calling subscriber has completed his dialing, he replaces his receiver and waits for the ringing to start. When the receiver is replaced, the loop circuit to relay 808 is opened. Relay 808 restores, and at contacts 809 closes a circuit to relay 810; the circuit extending from ground, contacts 809, 843, 832, 852', lower winding of relay 810 to battery. At contacts 809' the circuit to relay 840 is opened. However, relay 840 is slow-to-release and remains operated long enough to permit relay 810 at contacts 811 to close an alternate circuit to relay 840 and maintain this relay operated. At contacts 813 and 815 the circuit to relay 808 is further opened. At contacts 812 and 814, circuits are prepared to the minor switches and the ringing frequencies, and also connects resistance battery through upper winding of relay 830 to the negative side of the line, this last circuit extending via contacts 871, 876, resistor R869 to battery. At contacts 817 an obvious circuit is closed to relay 825. At contacts 816 and 818 the reverting control leads extending from the ringing interrupter are connected to the top wipers of minor switches MS–1 and MS–2 respectively. Relay 825 operates and by means of its pendulum type armature, at contacts 827 prepares a circuit to relay 808.

Figure 9:
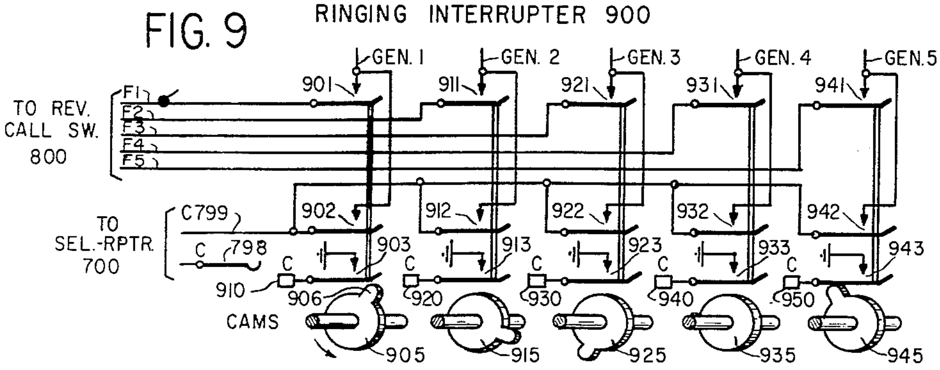
Fig. 9 shows a ringing interrupter 900 utilized in the main exchange.

Referring to Fig. 9, and the ringing interrupter 900, when the ringing machine was started via conductor C805 of reverting call switch 800, the cams 905, 915, 925, 935, and 945 began to turn, and by means of their lobes, such as 906 of cam 905, the insulated armatures such as 904, close their respective contacts in a sequential order. The lobe on each cam is spaced at a different location along its periphery in contrast to each other cam whereby, the cams operate their associated springs at different intervals. Thus, each of the five different frequencies will be transmitted to the different bottom bank contacts of minor switches MS–1 and MS–2 at different intervals and as uninterrupted generator current.

Figure 2:
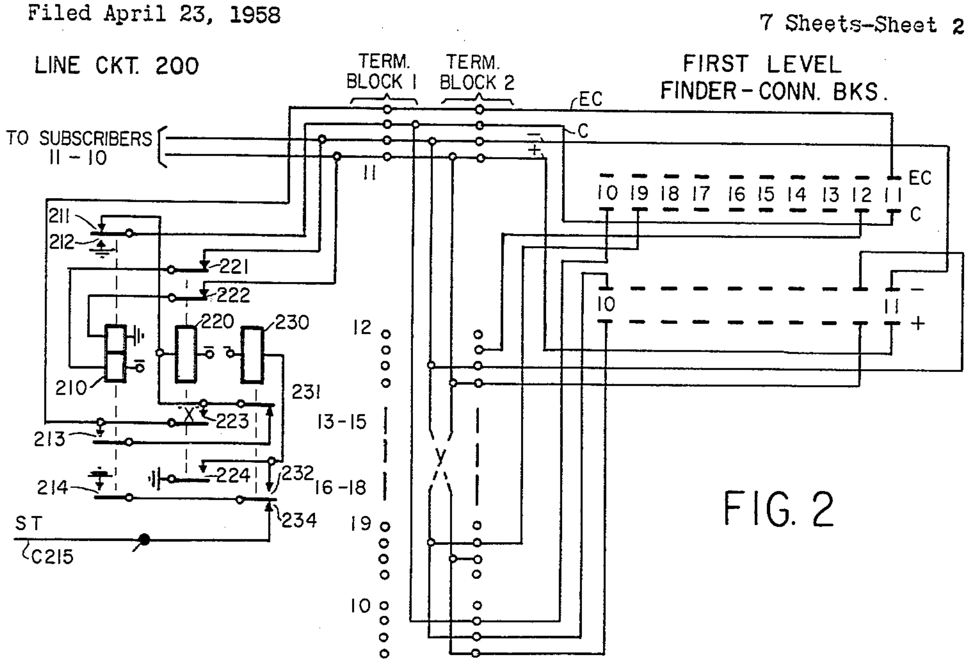
Figs. 2 and 2A show the first and second levels respectively of a finder-connector bank, which are accessible to the line circuits of subscriber lines which are on a terminal-per-station basis.

Before continuing with the ringing it will be recalled that with the arrangement shown in Fig. 2, all parties having a last digit from 1 to 5 will have their ringers on the negative side of the line, and all parties with a last digit from 6–0 will have their ringers on the positive side of the line. Thus, with the calling parties T13 ("13" representing the last two digits of his directory number), the first ringing frequency will be received over the negative side of the line, and the called party T16, the second ringing frequency will be received over the positive side of the line.

When relay 810 operated and closed contacts 816 ground was forwarded from conductor C806 (via the ringing interrupter) to complete a circuit to relay 870; the circuit extending via contacts 866, wiper 884 and contact 3 of MS–1, winding of relay 870 to battery. Relay 870 operates, and at contacts 871' closes the third frequency F3 to the negative side of the loop upon cam 925 of ringing interrupter 900 operating its associated springs; the circuit extending from conductor GEN. 3 (Fig. 9), contacts 921, conductor F3, third bottom bank contact on MS–1, wiper 882, contacts 871', upper winding of relay 830, contacts 821, 812, negative conductor C802, over the negative side of the loop circuit, negative wiper 403 of finder-connector 400, contact 1 on level 1, negative conductor C201 (Fig. 2), through the ringer (not shown), positive conductor C202, contact 1 on level 1, positive wiper 404, bank over the mentioned loop, positive conductor C803, contacts 814, 822, to ground. At contacts 872 an obvious circuit is closed to relay 865. At contacts 873 an obvious locking circuit is closed to relay 873. Relay 830 will not operate over the above mentioned ringing circuit due to a copper slug and sleeve on this relay. Relay 865 operates, and at contacts 866 opens the operating circuit to relay 870. However, relay 870 remains operated over the mentioned locking circuit. At contacts 867, a prepared circuit is opened to relay 820.

After a predetermined time interval ground is removed from conductor C806, and placed on conductor C807. Relay 870 restores, and at contacts 871 opens the ringing frequency from minor switch MS–1, and at contacts 871' prepares the ringing frequency from MS–2 to the positive side of the loop circuit. At contacts 872, the circuit to relay 865 is opened. Relay 865 restores, and at contacts 867 closes a circuit to relay 820; the circuit extending from ground on conductor C807, contacts 818, 867, wiper 894, sixth top bank contact of minor switch MS–2, lower winding of relay 820, to battery. Relay 820 operates, and at contacts 821' and 822' prepares the ringing circuit to the positive side of the line. At contacts 823, relay 820 prepares a locking circuit for itself. At contacts 824 an obvious circuit from ground on conductor C807 is closed to relay 875. Relay 875 operates and at contacts 876', closes the ringing frequency over the positive side of the line to subscriber T16; the circuit extending from ringing frequency F1, sixth bottom bank contact and wiper 892 of MS–2, contacts 876', 871, upper winding of relay 830, contacts 822', 814, over the positive side of the loop circuit through selector 500 and finder-connector 400, positive wiper 404 (Fig. 4), contact 1 level 1 of the banks, conductor C202, through the ringer of subscriber T16, negative conductor C201, bank contact, negative wiper 403, over the loop, negative conductor C802, contacts 812, 821' to ground. At contacts 877 an obvious circuit is closed to operate relay 865. At contacts 878' an obvious locking circuit is closed to the upper winding of relay 820. At contacts 879, an obvious locking circuit is closed to relay 875. At contacts 866, relay 865 opens the prepared operating circuit to relay 870 to prevent relay 870 from operating (receipt of ground on conductor C806) before relay 875 completes the ringing over the positive side of the line. At contacts 867 the operating circuit to relay 875 is opened. However, relay 875 remains operated over the mentioned locking circuit.

The ground from the ringing interrupter will alternately be placed on conductor C806 and then C807 to alternately operate relays 875, 820 and 870 to transfer the ringing frequencies from the negative and positive sides of side alternately in the manner described. Relay 865 operates each time relay 870 or 875 operates, and the release time of relay 865 delays closing the ground leads from the ringing interrupter until relay 820 restores to permit an overlap of pulses at the interrupter. Thus, the ringers of subscribers T13 and T16 will alternately ring.

When the called party T16 removes his receiver, the direct current circuit through relay 830 is closed through the line loop. Relay 830 operates, closing its "x" contacts 837 first, and locks itself operated through its lower winding via ground at contacts 845. Thereafter, relay 830 operates its remaining contacts whereby, at contacts 832 the circuit to relay 810 is opened. At contacts 833 and 834 the operating and locking circuits to relay 840 is opened. However, relay 840 is slow-to-release and remains operated a short duration. At contacts 835 and 836 a circuit is prepared to relay 808. At contacts 838, ground from release conductor C804 is closed to release magnets 883 and 893 of minor switches MS–1 and MS–2. Relay 810 restores, and at contacts 816 and 818 opens the circuits to relays 820, 870, and 875 to cause restoration thereof. At contacts 813 and 814 the loop circuit is closed to relay 808 to cause reoperation thereof. At contacts 817, the circuit to relay 825 is opened. The release magnets 883 and 893 energize to restore the minor switch wipers to normal, to in turn open the off-normal springs 881 and 891 to restore relays 850 and 855. Relay 825 restores, to cause vibration of its weighted armature whereby contacts 826 and 827 will alternately close and open for a few seconds to alternately charge and discharge capacitor 819 to provide a "tick tone"; the first circuit via battery, resistor R827, contacts 826 and 835; and the second circuit via ground, contacts 845, 936, resistor, contacts 827 and 835. The resultant "tick tone" informs the dialed party that this is a reverting call and he should wait until the dialing party removes his receiver. The reoperation of relay 808 closes contacts 809' to maintain slow-to-release relay 840 locked operated. In other words, relay 840 does not restore between the time relay 810 restores and relay 808 reoperates.

When the calling subscriber removes his receiver, both the calling and called party's telephones are connected across the positive and negative lines. Both parties are provided with transmission battery through the windings of relay 808.

*Release*

When both the calling and called parties have terminated their call and replaced their receivers, the loop circuit is opened to relay 808. Relay 808 restores and at contacts 809' opens the circuit to relay 840. Slow-to-release relay 840 after a short duration restores, and at contacts 842 removes ground from control conductor C801 to restore relay 520 in selector 500. At contacts 845 the circuit to relay 830 is opened. Slow-to-release relay 830 restores after a short duration, and at contacts 831 battery is placed on control conductor C801 to avail reverting call switch 800 for seizure.

In two-way selector 500, relay 520 restores and at contacts 522 and 524 further opens the loop circuit to reverting call switch 800. At contacts 527 a circuit is closed to release magnet 550; the circuit extending from ground, contacts 527, 532, 539, 566, winding of release magnet 550 to battery. At contacts 525 the holding circuit to relay 510 is opened. Release magnet 550 energizes and restores wipers 597—599 to normal, to in turn restore the V.O.N. springs to normal, opening V.O.N. contacts 556 to restore relay 560. The restoration of relay 560 at contacts 566 opens the energizing circuit to release magnet 550, to cause deenergization thereof. Relay 510 restores, and at contacts 511 places the high frequency alternating current on negative conductor C501 to initiate the release of finder-connector 400 in a manner previously described.

*Incoming calls to Sub-Office 1*

Assuming that subscriber T21 in sub-office 2 wishes to call subscriber T13 or T10 in sub-office 1, selector 150 will be seized in a manner described with respect to Outgoing Calls From Sub-Office 1. Selectors 100, 110, 120, and 130 will be seized in a conventional manner upon receipt of four series of digital impulses dialed by subscriber T21. It will be further assumed that the fifth digit dialed, the digit "7" will step the wipers of fifth selector 130 to its seventh level of bank contacts, and rotate the wipers therein to search for an idle selector-repeater, such as 700 (Fig. 7).

Selector-repeater 700 (Fig. 7) is found idle by selector 130 upon finding battery on control conductor C795, which extends via contacts 762, EC conductor C701, to two-way selector 500 (Fig. 5), contacts 574, 568, winding of relay 520 to battery. The seizure of selector-repeater 700 will extend the loop circuit hereto, to operate relay 775; the circuit extending via battery, upper winding of relay 775, contacts 782, negative conductor C796, over the loop circuit, positive conductor C797, contacts 784, lower winding of relay 775 to ground. At contacts 776, relay 775 prepares a loop circuit to finder-connector 400. At contacts 770 operates and at contacts 771 further prepares the loop circuit to finder-connector 400 (Fig. 4). At contacts 773, ground is placed on vertical wiper 791, and closes an obvious circuit to relay 745. At contacts 774' ground is returned over C conductor C795 to hold the preceding equipment in a well-known manner. Relay 745 operates, and at contacts 746 prepares a circuit to vertical magnet 750.

In two-way selector 500, relay 520 operates and at contacts 522 and 524 the loop circuit from selector-repeater 700 is extended to finder-connector 400. At contacts 526 ground from EC conductor C701 is closed to relay 510. At contacts 525 ground from EC conductor C701 is closed to relay 515. Relay 510 operates and at contacts 511, A.C. battery is removed from negative conductor C501 to restore relay 480 in finder-connector 400. At contacts 512, A.C. battery is removed from the loop circuit. Relay 515 operates, and at contacts 516 prepares a locking circuit to relay 520.

In finder-connector 400, the loop circuit is extended to relay 460; the circuit extending from battery, upper winding of relay 460, contacts 431, 474, negative conductor C501, contacts 522 (Fig. 5), negative conductor C702 (Fig. 7), contacts 711, 776, 771, winding of ringing control relay 725, contacts 712, positive conductor C703, contacts 524 (Fig. 5), positive conductor C502, contacts 474 (Fig. 4), 433, lower winding of relay 460 to ground. Over this last-mentioned circuit ringing control relay 725 in selector 700 will not operate due to a shunt on this relay via contacts 763. Relay 460 operates, and at contacts 461 closes an obvious circuit to relay 454. Relay 454 operates, and at contacts 455 closes an obvious circuit to relay 450. At contacts 456, relay 454 locks operated to ground from contacts 481 of restored relay 480. At contacts 457 a circuit is prepared to vertical magnet 465. At contacts 458 ground is placed on guard conductor (439) to busy finder-connector 400. Relay 450 operates, and at contacts 451 prepares a holding circuit for itself.

The sixth digit dialed by subscriber T21 will be the digit "1" corresponding to the level on which the called subscriber can be reached. Upon receipt of the single digital impulse, relay 775 will momentarily restore and reoperate one time. Upon the momentary restoration of relay 775, at contacts 776 the loop circuit is opened to relay 460 in finder-connector 400 to repeat the digit hereto. At contacts 777 the circuit to relay 770 is opened. However, relay 770 is slow-to-release and remains operated during the impulse series. At contacts 778, a circuit is closed to vertical magnet 750 via contacts 772 and 746. At the end of the dialing, relay 775 reoperates and opens the circuit to vertical magnet 750. Upon receipt of the single ground pulse, vertical magnet 750 stepped the control wiper 798 and vertical wiper 791 one step vertically, to operate the V.O.N. springs whereby, at V.O.N. contacts 751 an obvious circuit is closed to relay 760. Upon the vertical wiper 791 stepping to the first bank contact of the multipled vertical bank 790, a circuit is closed to relay 735; the circuit extending from ground, contacts 773, wiper 791, the multipled bank contacts, upper winding of relay 735 to battery. Relay 760 operates, and at contacts 761 maintains ground on EC conductor C701. At contacts 763, the shunt is removed from relay 725. However, the operation of relay 735 at contacts 737 places a second shunt on relay 725 to prevent operation thereof. Also, the removal of the first shunt took place when the loop circuit was opened, and replaced by the second shunt before the loop circuit was closed. At contacts 765 the circuit to relay 745 is opened causing restoration thereof. At contacts 736, relay 735 closes an obvious circuit to relay 730. Relay 730 operates, prepares a circuit to rotary magnet 740. It should be pointed out that control wiper 798 lies opposite the first level of bank contacts extending to a plurality of ringing frequencies in ringing interrupter 900.

In finder-selector 400, the receipt of the repeated digital impulse over the second loop circuit causes relay 460 to restore and operate one time. The momentary restoration of relay 460 will pulse vertical magnet 465; the circuit extending from ground, contacts 462, 457', 451, 478, winding of vertical magnet 465 to battery. Vertical magnet 465 will step the wipers 401, 402, 403, 404, and 406 to their respective first levels, to operate the V.O.N. springs whereby; at V.O.N. contacts 467 a second ground is placed on guard lead C439; at V.O.N. contacts 468 a circuit is prepared to release magnet 449; at V.O.N. contacts 469 the circuit to relay 450 is opened; at V.O.N. contacts 469' ground is placed on control wiper 402 via contacts 446, upper winding of relay 430, contacts 441, and 472. At the end of the digital impulse, slow-to-release relay 450 restores.

The seventh or last digit dialed into, and repeated by selector-repeater 700 will be to choose a ringing frequency in accordance with the called party's ringer. Assuming that the called party will be subscriber T13, the last digit dialed will be the digit "3."

Assuming first that the called party's line is busy, the following operations will take place. Upon receipt of the three digital impulses, relay 775, will restore and reoperate three times. Upon each restoration of relay 775, a circuit is closed to rotary magnet 740; the circuit extending from ground, contacts 778, 772, 747, 731, winding of rotary magnet 740 to battery. Also, over the last mentioned circuit, slow-to-release relay 735 will be maintained operated through its lower winding during the impulse series. Rotary magnet 740 will thus rotate its wiper 798 accordingly with the three ground pulses received to its third bank contact, and vertical wiper 791 will disengage its bank contact. At contacts 776 the three digital impulses are repeated to finder-connector 400 whereupon, relay 460 restores and reoperates three times. Upon each restoration of relay 460, a circuit is closed to rotary magnet 485; the circuit extending from ground, contacts 462, 457', 452, 448, 436, 477, winding of rotary magnet 485 to battery. Thus upon the receipt of three ground pulses, rotary magnet 485 will energize and deenergize three times to rotate the wipers 401—404 to their third bank contacts respectively on the first level. With the called party being busy, ground will appear on control wiper 402 from contacts 212 of relay 210 in the line circuit (Fig. 2), to prevent relay 430 from operating. Relay 735 being slow-to-release, after a short duration restores at the end of the digital impulse series to in turn, restore relay 730. This restoration of relay 737 opens the shunt across ringing control relay 725 to operate relay 725 over the loop circuit to finder-connector 400. At contacts 726, a shunt is placed across the repeating circuit to prevent finder-connector 400 from responding to any further dialed digits. At contacts 727, busy tone is returned to the calling party via conductor C705, and back over the positive side of the line to notify the calling party of the busy condition. The calling subscriber would then replace the receiver to terminate the call, and restore the equipment in a manner to be described in the ensuing disclosure.

Assuming however, that the called part was not busy, relay 430 would operate from battery on control wiper 402; the circuit extending from wiper 402, contacts 472, 441, upper winding of relay 430, contacts 446, 469', 455 to ground. Also, over the above mentioned circuit relay 220 in line circuit 200 (Fig. 2) will operate in series with relay 430 whereby, at contacts 221 and 222 the prepared circuit to relay 210 is opened. At contacts 224 an obvious circuit is closed to relay 230. Relay 230 operates and at contacts 234 opens the prepared circuit to start lead C215 to prevent the operation of an allotter by any other party on the same line. Relay 430 operates its "*x*" contacts 438 first to close a locking circuit for itself through its lower winding via ground at contacts 481. At contacts 431 and 433 the circuit to relay 460 is opened. At contacts 432 and 434 loop circuit is extended to the called line via the line circuit 200. At contacts 435 a locking circuit is closed to relay 220 in line circuit 200. At contacts 436 and 437, prepared circuits to rotary magnet 485 and release magnet 449 respectively are further opened. Relay 460 restores, and at contacts 461 opens the operating circuit to relay 454 however, relay 454 remains operated over the mentioned locking circuit.

At the end of the digital impulse series slow-to-release relay 735 restores after a short duration, to in turn restore relay 730. In this case, battery has been removed from the trunk before relays 730 and 735 restore to prevent relay 725 from operating. At this time wiper 798 is in engagement with the third bank contact extending to ringing interrupter 900, and more specifically contact 930 whereby, ground is returned to prepare a circuit to relay 715. The restoration of relay 730 closes a circuit to relay 710; the circuit extending from ground, contacts 773, 766, 748, 732, 728, winding of relay 710 to battery. Relay 710 operates and at contacts 711 and 712 opens the circuit to relay 725 to insure the non-operation of relay 725. At contacts 711' the ringing circuit to the called party's line is prepared. At contacts 713, ground from C wiper 798 is closed to relay 715. Relay 715 operates and at contacts 717 closes the ringing frequency over the negative side of the line; the circuit extending from lead GEN. 3 (Fig. 9), contacts 922, conductor C799, contacts 717, upper winding of relay 720, contacts 721, 711', negative conductor C702 and back over the negative side of the line and through the ringers on the called line and back over the positive conductor C703, contacts 712', 722 to ground. At contacts 716 ringback tone from conductor C704 will be returned over the positive side of the line to notify the calling party that the ringing is taking place. This ringing frequency will be intermittently applied each time the lobe of cam 925 engages the lower spring during rotation. Relay 720 will not operate over the above mentioned circuit during ringing. Due to the chosen ringing frequency, only the ringer of subscriber T13 will respond and ring.

Upon receipt of the ringing, the called subscriber T13 will respond by removing the receiver to open the ringer circuit and stop ringing. This will also close the loop circuit to relay 720 to cause operation thereof. Relay 720 closes its "*x*" contacts 724 first, to close a holding circuit through its lower winding via ground at contacts 773, and thereafter at contacts 721 and 722 its operating circuit is opened. At contacts 721' and 722' a circuit is closed to relay 780; the circuit extending from battery, upper winding of relay 780, contacts 721', 711' negative conductor C702, contacts 522 (Fig. 5), negative conductor C501, contacts 473, 432, wiper 403 (Fig. 4), conductor C201, subscriber T13's receiver, positive conductor C202, wiper 404 (Fig. 4), contacts 434, 474, positive conductor C502 (Fig. 5), contacts 524, positive conductor C703 (Fig. 7), contacts 712', 722', lower winding of relay 780 to ground. At contacts 723 the circuit to relay 715 is opened. Relay 715 restores and at contacts 716 removes ringback tone from the calling line. Relay 780 operates, and at contacts 781 and 783 the polarity is reversed back to the calling subscriber from relay 775. Relay 775 will provide transmission battery for the calling subscriber, and relay 780 will provide transmission battery for the called subscriber.

In the event of a call to subscriber T10, the same operations as described would take place with the exception, that the last digit dialed would be the digit "0." This would cause control wiper 798 to engage contact 950 in ringing interrupter 900, and transmit the ringing frequency of GEN. 5. Also, this frequency would be sent over the negative side of the line and then transferred to the positive side of the line at the terminal blocks as shown in Fig. 2. Thus, the ringing interrupter 900 provides five different frequencies which are divided between the negative and positive side of the lines, or more commonly called divided ringing.

*Release*

Upon the termination of the call, the calling and called parties will replace their receivers on the cradle. When the called subscriber T13 or T10 hangs up the loop circuit is opened to restore relay 780. When the calling subscriber hangs up, relay 775 restores. At contacts 777, relay 775 opens the circuit to relay 770. After a short duration slow-to-release relay 770 restores, and at contacts 773 opens the circuits to relays 710 and 720. At contacts 774' ground is removed from control conductor C795 to release the preceding equipment in a conventional manner. At contacts 774 an obvious circuit is closed via contacts 767 to energize release magnet 775. Relay 710 restores and at contacts 711' and 712' opens the loop circuit to the succeeding equipment. Relay 720 restores. Release magnet 755 energizes to restore wipers 790 and 798 to normal, to in turn restore the V.O.N. springs to normal whereby, V.O.N. contacts 751 open the circuit to relay 760. Relay 760 restores and at contacts 761 removes ground from EC conductor C701 to initiate the release of the succeeding equipment. At contacts 767 the circuit to release magnet 755 is opened to cause de-energization thereof. Selector-repeater 700 is now available for future use.

The removal of ground from EC conductor C701 restores relays 510 and 520 in selector 500, and at contacts 522 and 524 further opens the loop circuit. Relay 510 restores and at contacts 511 places A.C. on the negative conductor C501 to initiate the release of finder-connector 400 in a manner previously disclosed.

Figure 2A:
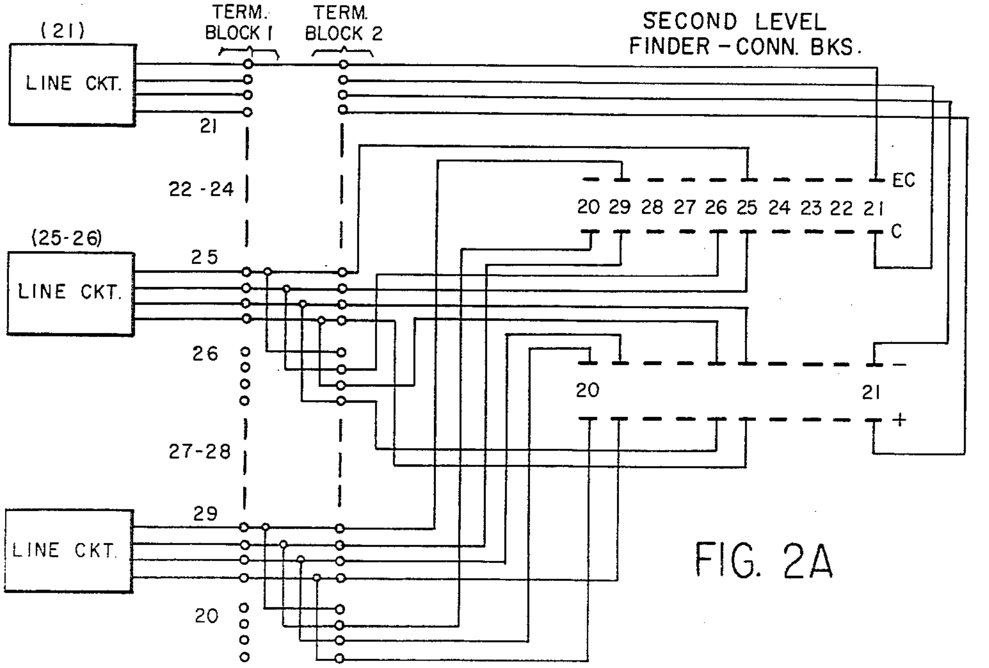

Referring briefly to Fig. 2A, the second level of bank contacts of finder-connector 400 are shown. This is not a modification of Fig. 2 but merely an example as to how the different levels could be wired. In other words each level need not necessarily comprise a ten party line but rather could be changed to two party, single party, etc., by changing the connections at the terminal blocks, without changing the subscriber's telephone number. Fig. 2A shows as an example a single party line 21 and two party lines 25—26 and 29—20. Subscriber 21 would have its own line circuit and would be rung on the negative side of the line. Subscribers 25 and 26 would have a common line circuit with subscriber 25 being rung on the negative side of the line and subscriber 26 on the positive side of the line. Subscribers 29 and 20 would likewise have a common line circuit however, with both subscribers being rung on the positive side of the line.

In order to accommodate the different types of party or single lines on each level of finder-connector 400, the different levels extending to the ringing interrupter must have corresponding ringing frequencies wired accordingly. For instance, if we assume that the third level (not shown) on finder-connector 400 has all single party lines, they may just as well all have the same frequency ringer, wherein the third level extending to the ringing interrupter would all be the same frequency to correspond accordingly. Thus, with such a system as described, any plurality of ringing combinations could be accomplished.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, a plurality of sub-office exchanges, a plurality of subscriber lines in each sub-office, a main exchange, a selector-repeater in said main exchange, a plurality of finder-connectors in each sub-office, means for extending a loop circuit from a first of said sub-offices to said selector-repeater, extending means in said selector-repeater for extending a second loop circuit to one of said finder-connectors in a second of said sub-office exchanges, initiating means in said selector-repeater for initiating the selection of a ringing frequency, repeating means for repeating a first series of digital impulses, said initiating and said repeating means simultaneously responsive to the receipt of a first series of digital impulses, initiating means in said finder-connector for initiating the seizure of a called subscriber's line responsive to the receipt of said repeated first series of digital impulses, selecting means in said selector-repeater for selecting a ringing frequency, said repeating means repeating a second series of digital impulses and said selecting means selecting said ringing frequency simultaneously responsive to the receipt of a second series of digital impulses, seizing means in said finder-connector for seizing said called subscriber line responsive to the receipt of said repeated second series of digital impulses, transmitting means in said selector-repeater operative responsive to the seizure of said called subscriber's line for transmitting said ringing frequency to said called line to ring said called subscriber.

2. In a telephone system, a main exchange, a plurality of sub-office exchanges, a plurality of finder-connectors in each sub-office having access to a plurality of single station and party lines on a terminal per station basis, a selector-repeater in said main exchange, means for extending a loop circuit to said selector-repeater from a first of said sub-offices, extending means in said selector-repeater for extending a second loop circuit to a finder connector in a second sub-office responsive to the extension of said first loop circuit, repeating means in said selector-repeater for repeating all received digital impulses via said second loop circuit, initiating means in said selector-repeater for preparing and determining the selection of a plurality of ringing frequencies responsive to the receipt of a first series of digital impulses, means in said finder-connector responsive to the receipt of a first and second series of repeated digital impulses for seizing a single station or a party line depending upon the digital values received, said initiating means responsive to the receipt of a second series of digital impulses for selecting and transmitting a predetermined ringing frequency to said called line via said finder-connector providing said called line is found idle.

3. In a telephone system, a main exchange, a plurality of sub-office exchanges, a selector-repeater in said main exchange, a finder-connector in each sub-office, means for extending a first loop circuit from one of said sub-offices to said selector-repeater, means responsive to the extension of said first loop circuit for extending a second loop circuit from said selector-repeater to a finder-connector in a second sub-office, repeating means in said selector-repeater for repeating all received digital impulses over said second loop circuit to said finder-connector, a control wiper and a vertical wiper in said selector-repeater, said control wiper accessible to a plurality of ringing frequencies on each of a plurality of levels of bank contacts, first means in said selector-repeater for stepping said control wiper to a predetermined level of bank contacts responsive to the receipt of a first series of digital impulses, a normally shunted ringing control relay in said selector-repeater, said first means in said selector-repeater stepping said vertical wiper to remove said shunt and initiate a second shunt across said ringing control relay responsive to the receipt of said first series of digital impulses, second means in said selector-repeater for rotating said control wiper to a predetermined bank contact on said selected bank level to select a predetermined ringing frequency responsive to the receipt of a second series of digital impulses, said second means in said selector-repeater causing said vertical wiper to disengage its bank contact to remove said second shunt responsive to the receipt of said second series of digital impulses, engaging means in said finder connector responsive to the receipt of said two series of digital impulses repeated by said selector-repeater for engaging a predetermined called line, and controlled means in said finder-connector responsive to said ringing control relay, said ringing control relay operable under one condition of said controlled means to transmit the selected ringing frequency to said called line and operable under another condition of said controlled means to prevent transmission of said selected ringing frequency.

4. In a telephone system as claimed in claim 3, including a source of busy tone in said selector-repeater, means responsive to the operation of said ringing control relay for transmitting said busy tone back over said first loop circuit for notification of a busy condition.

5. In a telephone system as claimed in claim 4, including a source of ring-back tone in said selector-repeater, means responsive to the failure of said ringing control relay to operate wherein said ring-back tone is returned back over said loop circuit for notification that said ringing frequency is being transmitted to said called line.

6. In a telephone system, a main exchange, a sub-office exchange, a selector-repeater in said main exchange, a finder-connector in said sub-office exchange, means for seizing said selector-repeater, means responsive to seizure of said selector-repeater for extending a loop circuit to said finder-connector, repeating means in said selector-repeater for repeating all series of received digital impulses over said loop circuit, preparing means in said selector-repeater for preparing the selection of a plurality of ringing frequencies responsive to the receipt of a first series of digital impulses, selecting means in said selector-repeater selecting a predetermined ringing frequency of said plurality of ringing frequencies responsive to the receipt of a second series of digital impulse, seizing means in said finder-connector for seizing a predetermined called subscriber line responsive to the receipt of said first and second series of repeated digital impulses, a ringing control relay in said selector-repeater, means controlled in said finder-connector dependent upon the idle or busy condition of said called subscribers line for determining the operation or non-operation of said ringing control relay, whereby the operation of said ringing control relay prevents the transmission of said selected ringing frequency to said called subscribers line, and the failure of said ringing control relay to operate permits the transmission of said selected frequency to said called subscribers line.

7. In a telephone system, a main exchange, a plurality of sub-office exchanges, a plurality of finder-connectors in each sub-office having access to a plurality of single station and party lines on a terminal per station basis, a selector-repeater in said main exchange, means for extending a loop circuit to said selector-repeater from a first of said sub-offices, extending means in said selector-repeater for extending a second loop circuit to a finder-connector in a second of said sub-offices responsive to the extension of said first loop circuit, repeating means in said selector-repeater for repeating all received digital impulses via said second loop circuit, initiating means in said selector-repeater for preparing and determining the selection of a plurality of ringing frequencies responsive to the receipt of a first series of digital impulses, actuating means in said finder-connector responsive to the receipt of a first series of repeated digital impulses for initially actuating said finder-connector to a selecting level, said actuating means in said finder-connector responsive to the receipt of a second series of repeated digital impulses for seizing a single station in response to any one of a first plurality of digital values or a party line in response to any one of a second plurality of digital values, said actuating means responsive to the receipt of a second series of digital impulses for selecting and transmitting a predetermined ringing frequency to said called line via said finder-connector in the event said called line is idle.

8. In a telephone system. a main exchange, a plurality of sub-office exchanges, a selector repeater in said main exchange, a plurality of finder-connectors in each sub-office, said finder-connector accessible to a plurality of levels of bank contacts containing single party and multiple party lines on different levels, means for extending a loop circuit from one of said sub-offices to said selector-repeater, means in said selector-repeater responsive to the extension of said loop circuit for extending a second loop circuit between said selector-repeater and a finder-connector in a second of said sub-offices, repeating means in said selector-repeater for repeating all received digital impulses over said second loop circuit to said finder-connector, a plurality of bank contacts with certain levels containing a plurality of different ringing frequencies and other levels containing the same ringing frequency accessible by a wiper in said selector-repeater, means in said selector-repeater responsive to the receipt of a first series of digital impulses for stepping said wiper adjacent a predetermined level, means in said finder-connector responsive to the receipt of said repeated first series of digital impulses to step its wipers adjacent to a corresponding predetermined level of bank contacts containing subscriber lines, said subscriber lines corresponding in location on said last mentioned level to the frequencies selected of said first mentioned level, means in said selector-repeater responsive to the receipt of a second series of digital impulses to cause said wiper to seize a predetermined ringing frequency on said first mentioned selected level, and means in said finder-connector responsive to the receipt of said second series of repeated digital impulses for causing the wipers to seize a predetermined subscriber line, means for transmitting said ringing frequency to said subscriber line responsive to an idle condition existing thereon, and said ringing frequency operable to notify a predetermined single party or multiple party subscriber on said subscriber line corresponding to the received ringing frequency.

9. In a telephone system as claimed in claim 8, including means responsive to answering the call by the called subscriber to provide transmission battery closed from said selector-repeater to said calling and called end.

10. In a telephone system, a main exchange, a sub-office exchange, a selector-repeater in said main exchange, a finder-connector in said sub-office, said finder-connector accessible to a plurality of levels of bank contacts containing single party or multiple party lines on different levels, means for seizing said selector-repeater, means responsive to seizure of said selector-repeater for extending a loop circuit to said finder-connector, repeating means in said selector-repeater for repeating all received digital impulses over said loop circuit, a plurality of bank contacts with certain levels containing a plurality of different ringing frequency accessible by a wiper in said selector-repeater, means in said selector-repeater responsive to the receipt of a first series of digital impulses for stepping said wiper adjacent a predetermined level, means in said finder-connector responsive to the receipt of said repeated first series of digital impulses to step its wipers adjacent to a corresponding predetermined level of bank contacts containing subscriber lines, said subscriber lines corresponding in location on said last mentioned level to the frequencies selected of said first mentioned level, means in said selector-repeater responsive to the receipt of a second series of digital impulses to cause said wiper to seize a predetermined ringing frequency on said first mentioned selected level, means in said finder-connector responsive to the receipt of said second series of repeated digital impulses for causing the wipers to seize a predetermined subscriber line, means for transmitting said ringing frequency to said subscriber line responsive to an idle condition existing thereon, and said ringing frequency operable to notify a predetermined single party or multiple subscriber on said subscriber line corresponding to the received ringing frequency.

11. In a telephone system, a plurality of sub-office exchanges, a plurality of subscriber lines in each sub-office, a main exchange, a selector-repeater in said main exchange, a plurality of subscriber line connecting switches in each sub-office, means for extending a connection from a first of said sub-offices to said selector-repeater, extending means in said selector-repeater for extending a second loop circuit to one of said line connecting switches in a second of said sub-office exchanges, initiating means in said selector-repeater for preparing and determining the selection of a group of ringing frequencies responsive to the receipt of a first series of digital impulses, means in said line connecting switch responsive to the receipt of a first and second series of digital impulses over said second loop circuit for seizing a subscriber line, and means responsive to the receipt of said second series of digital impulses for selecting and transmitting a predetermined ringing frequency of said group from said selector-repeater to said seized line.

12. In a telephone system, a plurality of sub-offices, a plurality of subscriber lines in each sub-office, a main exchange, a selector-repeater in said main exchange, a plurality of subscriber line connecting switches in each sub-office, means for extending a connection from a first of said sub-offices to said selector-repeater, extending means in said selector-repeater for extending a second loop circuit to one of said line connecting switches in a second of said sub-office exchanges, repeating means in said selector-repeater for repeating all received digital impulses over said second loop circuit, initiating means in said selector-repeater for preparing and determining the selection of a group of ringing frequencies responsive to the receipt of a first series of digital impulses, means in said line connecting switch responsive to the receipt of a first and second series of repeated digital impulses in said second loop for seizing a subscriber line, and said initiating means responsive to the receipt of said second series of digital impulses for selecting and transmitting a predetermined ringing frequency of said group from said selector-repeater to said seized line.

References Cited in the file of this patent

UNITED STATES PATENTS 2,706,747 Kessler ---------------- Apr. 19, 1955